United States Patent [19]

Kremser

[11] Patent Number: 4,967,860
[45] Date of Patent: Nov. 6, 1990

[54] PROCESS AND APPARATUS FOR LOCATING AN OBSTACLE

[75] Inventor: Johann Kremser, Bruck an der Mur, Austria

[73] Assignee: Carl Schenck AG, Fed. Rep. of Germany

[21] Appl. No.: 303,155

[22] Filed: Jan. 27, 1989

[30] Foreign Application Priority Data

Jan. 30, 1988 [EP] European Pat. Off. ........ 88101358.5

[51] Int. Cl.$^5$ ............................................. B62D 1/24
[52] U.S. Cl. .................................... 180/169; 367/909
[58] Field of Search ............... 180/167, 169; 340/435, 340/903, 904; 367/909

[56] References Cited

U.S. PATENT DOCUMENTS

| | | | |
|---|---|---|---|
| 3,749,197 | 7/1973 | Deutsch | 180/169 |
| 4,240,152 | 12/1980 | Duncan et al. | 340/904 X |
| 4,636,996 | 1/1987 | Tsuji | 367/909 X |
| 4,658,385 | 4/1987 | Tsuji | 180/169 X |
| 4,674,073 | 6/1987 | Naruse | 340/904 X |

FOREIGN PATENT DOCUMENTS

| | | |
|---|---|---|
| 3034511 | 4/1981 | Fed. Rep. of Germany . |
| 3518613 | 1/1987 | Fed. Rep. of Germany . |
| 0045583 | 3/1983 | Japan .................................. 180/167 |
| 1131487 | 12/1984 | U.S.S.R. .............................. 180/167 |

Primary Examiner—Richard A. Bertsch
Assistant Examiner—Brian Johnson
Attorney, Agent, or Firm—Connolly and Hutz

[57] ABSTRACT

An unmanned movable and steerable vehicle has a device for locating obstacles in relation to a coordinate system which moves along with the vehicle. Ultrasonic waves transmitted by transmitters on the vehicle in the driving direction thereof and ultrasonic waves reflected back to the vehicle by obstacles and received by receivers on the vehicle produce information whereby vehicle steering and/or braking signals function to prevent a collision. For the purpose of an interference-free, accurate location determination of an obstacle in relation to the coordinate system moved along with an unmanned movable and steerable vehicle, a single pulse is transmitted by two adjacent ultrasonic waves and also received again at the transmission sources. In a progression by one another sound source, after the first sound source has been switched off, the same procedure of transmitting a single pulse and, in the presence of an obstacle, the reception of a reflected ultrasonic echo is possible. The size and position of an obstacle in front of the vehicle can then be received interference-free.

10 Claims, 6 Drawing Sheets

$$\Delta T = \frac{\sqrt{X^2 + Y_W^2} - X}{V_{sound}}$$

$\Delta T$ = travel time difference (s)
$V_{sound}$ = speed of sound in air (m/s)
$X, Y_W$ = (m)

PROCESS AND APPARATUS FOR LOCATING AN OBSTACLE

BACKGROUND OF THE INVENTION

The present invention relates to a process for locating an obstacle in relation to a coordinate system moved along with an unmanned, movable and steerable vehicle by means of ultrasonic waves emitted in the direction of travel by transmitters and reflected ultrasonic waves received by sensors when in the presence of an obstacle. According to the received information, steering and/or braking signals are forwarded to the vehicle for the prevention of a collision with the obstacle. Moreover, the invention relates to a system for locating the position of such obstacle.

German Patent 35 18 613 discloses an obstacle detection system for a self-propelled steerable vehicle having on its side pointing in the driving direction a plurality of ultrasonic wave pulse transmitters arranged in a row next to each other. At least one ultrasonic wave receiver is located in the center of the row along with a device for the excitation of the ultrasonic wave transmitter. A reception evaluation device supplies information about an obstacle located in the driving direction and about its present course with respect to the longitudinal axis of the vehicle. This system is distinguished in that only the one receiver is associated with the plurality of transmitters, in that the equal frequency excitation begins at the same time, and in that in a first mode of operation, the transmitters adjacent to the receiver emit a maximum of pulses and the again adjacent transmitters with increasing distance from the receiver emit a decreasing number of pulses. In a second mode of operation, the transmitter at one end of the row emits a maximum number of pulses and the other transmitters emit a decreasing number of pulses with increasing distance from the receiver. In a third mode of operation, the transmitter at the other end of the row emits a maximum number of pulses while the other transmitters emit a decreasing number of pulses with increasing distance from the receiver. A locating system is disclosed in which as a result of deliberately directed ultrasonic waves the center region as well as the two side regions are only scanned at certain sites so that a constant monitoring of the driving space in front of an unmanned vehicle is not possible. In order to obtain a signal, a plurality of ultrasonic pulses must always be omitted. This leads to expensive and not at all error-free monitoring and evaluation.

German OS 30 34 511 discloses an obstacle detector for vehicles which monitors the space in front of a vehicle by means of light signals and whereby as a result of reflection of the beams on obstacles, a timely braking of the vehicle in front of an occurring obstacle is initiated. Error-free monitoring of the space in front of an unmanned vehicle is not possible with this detector.

The state of the art which has become known thusfar does not include any protective measures against foreign influences such as foreign light sources or foreign ultrasonic transmitters which may falsify or nullify the monitoring result. The monitoring of a pulse curve emitted by a plurality of transmitters by one single receiver is also quite expensive. When the single ultrasonic receiver fails, moreover, the entire ultrasonic monitoring device shuts down.

SUMMARY OF THE INVENTION

With the above as background, one object of the present invention is to conduct an accurate position determination of an obstacle, free of interference, in relation to a coordinate system moved with an unmanned movable and steerable vehicle. Included in the process is the emission of an ultrasonic pulse from each of two adjacent ultrasonic transducers wired as ultrasonic transmitters, in equal phase and equal frequency. The ultrasonic waves reflected at a possible obstacle may be received at the same site at which the ultrasonic pulse was emitted frequency analysis of the received information is made. A subsequent progression and renewed emission of the ultrasonic pulse by the second and the new source is carried out as well as receiving a reflected ultrasonic wave likewise at the sites of the emission. A frequency analysis of these values is made and a progression over the entire width of the vehicle. A definite and reliable monitoring of the space in front of an unmanned vehicle is obtained which becomes interference-free as a result of the frequency analysis of the received ultrasonic pulses. In addition, the twin equal phase and equal frequency, emission of an ultrasonic pulse causes an amplification which, according to the invention, leads to a greater range of the individual pulse, in contrast to the emission of the individual pulse from one transmitter.

As a result of the frequency change in stepping to the next pair of transmitters, the influence of an obliteration of reflected waves by the surface of the detected object is definitely prevented. This is particularly significant when people wearing differently absorbing garments produced, for example, by the mesh count of the fabric enter the driving area of an unmanned vehicle.

In one case, the driving space in front of the vehicle is first scanned with one frequency. In the next scanning procedure the vehicle is scanned with another frequency and in subsequent scanning procedures likewise with other frequencies. The use of three ultrasonic frequencies is quite sufficient for a reliable monitoring of the driving space in front of the unmanned vehicle.

Stepping of the ultrasonic pulses each time to be emitted in pairs is important. These various stepping rules have a great significance when the unmanned vehicle either travels in warehouses having relataively narrow aisles or on open terrain where obstacles can enter the drive path from both sides, for example, when people or other unmanned vehicles or when the unmanned vehicle drives along a wall where interference with the driving space can only come from one side.

The measurement of the travel time of reflected ultrasonic waves to the sites of their transmission provides for the determination of the exact position of an obstacle to the coordinate source by subtracting the two travel times.

The innovative process specification of providing at least one travel time threshold makes the determination possible whether the obstacle is present between the two receivers closer to one or closer to the other receiver or whether the obstacle is perhaps present outside of the driving space but, nevertheless, in the safety zone of the vehicle or whether the obstacle is a voluminous article against a wall present in front of the vehicle in the driving space.

The objective on which the invention is based can also be met by a locating system for the position of an obstacle to a coordinate system moving with an unmanned vehicle with ultrasonic transmitters and ultrasonic receivers arranged on the front of the vehicle. As a result of the arrangement of at least three equally spaced ultrasonic transmitters which can be converted to ultrasonic receivers on the front of the unmanned vehicle, an ultrasonic scanning of the space in front of the vehicle is obtained. This ultrasonic information is fed to a computer for analysis. The resulting ultrasonic grid in front of the vehicle can be adapted to any desired vehicle width and provides an accurate ultrasonic image of possibly present obstacles. By changing the distances between the transducers, the ultrasonic grid can also be made narrower or wider as a function of the monitoring conditions. In contrast to known monitoring devices which must be enlarged at least with two additional elements, the locating system according to the present invention can easily be enlarged with a single transducer serving as ultrasonic transmitter and receiver.

The present invention also includes a particular circuit arrangement for the transducers to be wired as transmitters and receivers which provides for the possibility that the uneven numbered receivers and even numbered receivers can be switched to one inlet in a memory. Additionally, the invention herein includes the arrangement of an electrostatic transducer in a contamination-proof housing and a piezotransducer included in the housing.

BRIEF DESCRIPTION OF THE DRAWING

Novel features and advantages of the present invention in addition to those noted above will become apparent to persons of ordinary skill in the art from a reading of the following detailed description in conjunction with the accompanying drawing wherein similar reference characters refer to similar parts and in which.

DETAILED DESCRIPTION OF THE INVENTION

Figure 1:
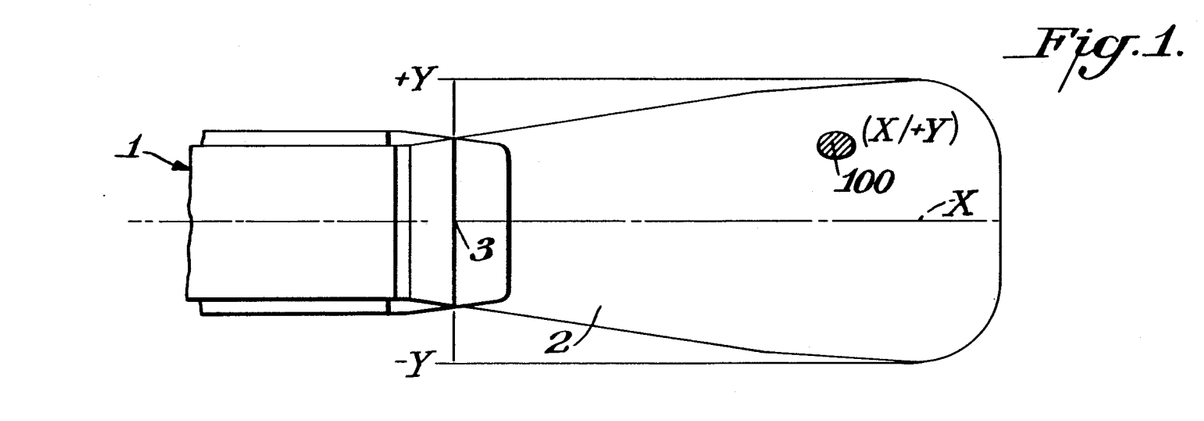
FIG. 1 is a diagrammatic top plan view of an unmanned and steerable vehicle also illustrating the ultrasonic location zone in front of the vehicle.

Referring in more particularlity to the drawings, FIG. 1 shows an unmanned vehicle 1 in plan view with an ultrasonic location zone defined by an interrupted line for the sake of clarity. This ultrasonic zone 2 keeps on extending in the momentary driving direction of the unmanned vehicle 1. A coordinate system with an coordinate source 3 is provided. In the illustrated embodiment, this system is an orthogonal coordinate system whereby the coordinate source 3 is located on the longitudinal center axis of the vehicle 1. The X-axis of this coordinate system extends in the driving direction of the vehicle while the Y-axis is perpendicular to the driving direction. An obstacle 100 assumed to be in this coordinate system is, therefore, defined in its position by the coordinates X and Y.

FIG. 1 also shows that the ultrasonic location zone 2 extends beyond the vehicle width of the unmanned vehicle 1 so that obstacles outside of the width of the vehicle can also be determined. This is particularly important when active cross traffic or pedestrians must be kept in mind so that these interferences in the zone in front of the unmanned vehicle 1 are recognized early enough that for these interferences, timely evasive movements of the unmanned vehicle 1 can be initiated.

Figure 2:
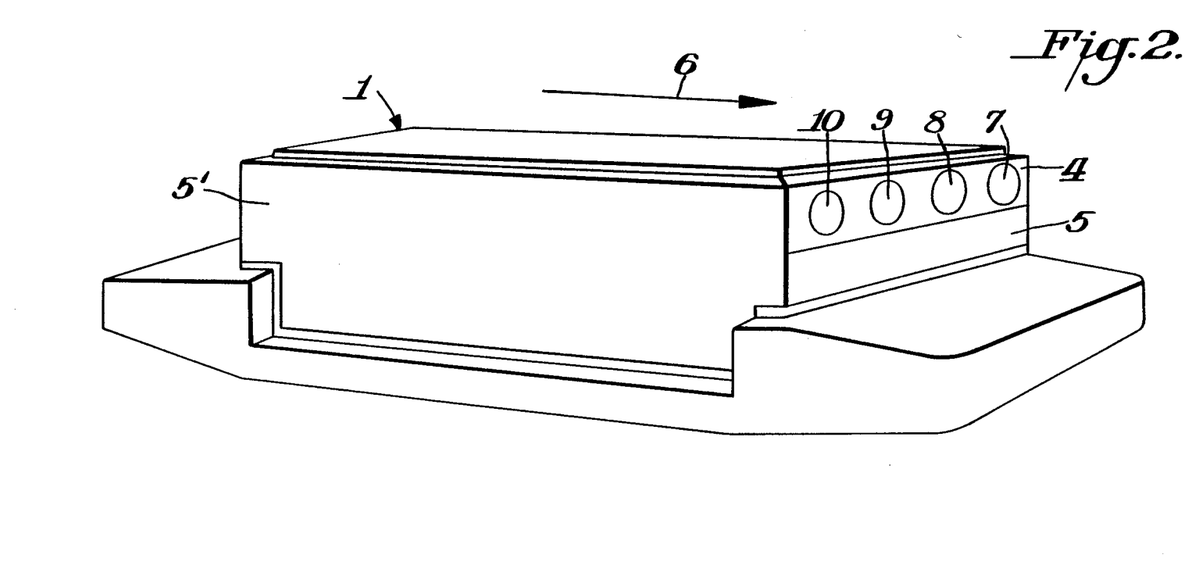
FIG. 2 is a perspective view of an unmanned vehicle with an obstacle location system, according to the present invention.

FIG. 2 shows the unmanned vehicle 1 in loaded state. An ultrasonic locating device 4 is positioned on one face 5 or, if necessary, also on the other face 5' of the unmanned vehicle. An arrow 6 shows the momentary direction in positive X-direction. The ultrasonic locating device 4 as a function of the vehicle width has a certain number of ultrasonic transducers 7, 8, 9, and 10 arranged in a row next to each other. These ultrasonic transducers 7, 8, 9, and 10 are operated in a so-called "single transducer mode". In other words, each individual ultrasonic transducer 7, 8, 9, and 10 functions as a transmitter as well as a receiver. The number N of ultrasonic transducers which act as transmitters as well as receivers which are required for a definite ultrasonic monitoring of the space in front of the vehicle essentially depends on the vehicle width and is determined according to the following equation:

$$N = \left[ \frac{\text{vehicle width} - \alpha}{\beta} \right] + 1$$

in which:

N represents the number of ultrasonic transducers used per vehicle width in millimeters;

$\alpha$ is a constant for the edge width of the vehicle and in the exemplified embodiment was set at 100;

$\beta$ is a constant dimension for the distance between two ultrasonic transducers in mm in order to obtain a definite uninterrupted monitoring; in the exemplified embodiment, this dimension was set at 300 mm.

Figure 3A:
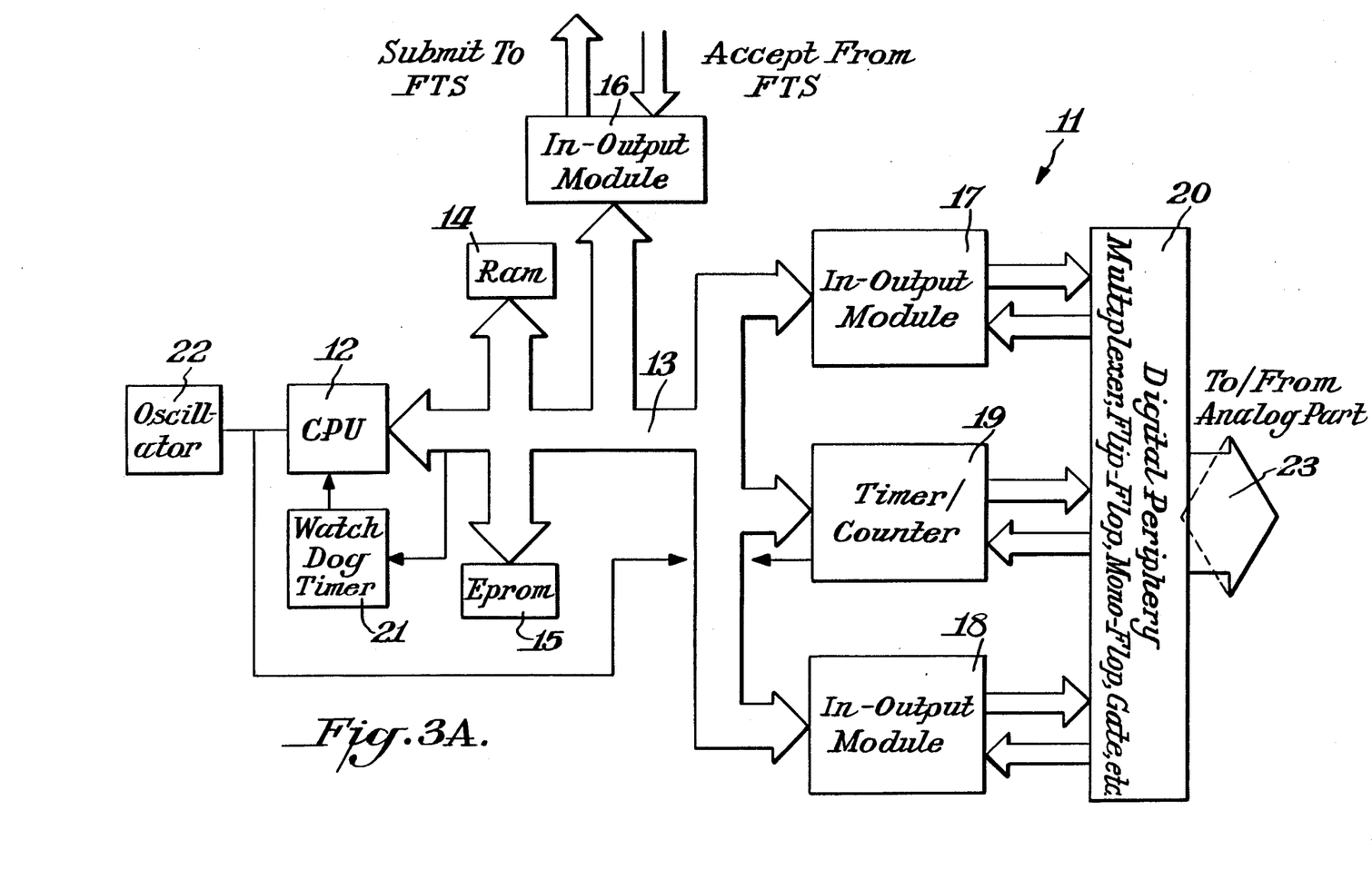
FIGS. 3A and 3B are block diagrams illustrating the arrangement for control of the location device of the present invention.
Figure 3B:
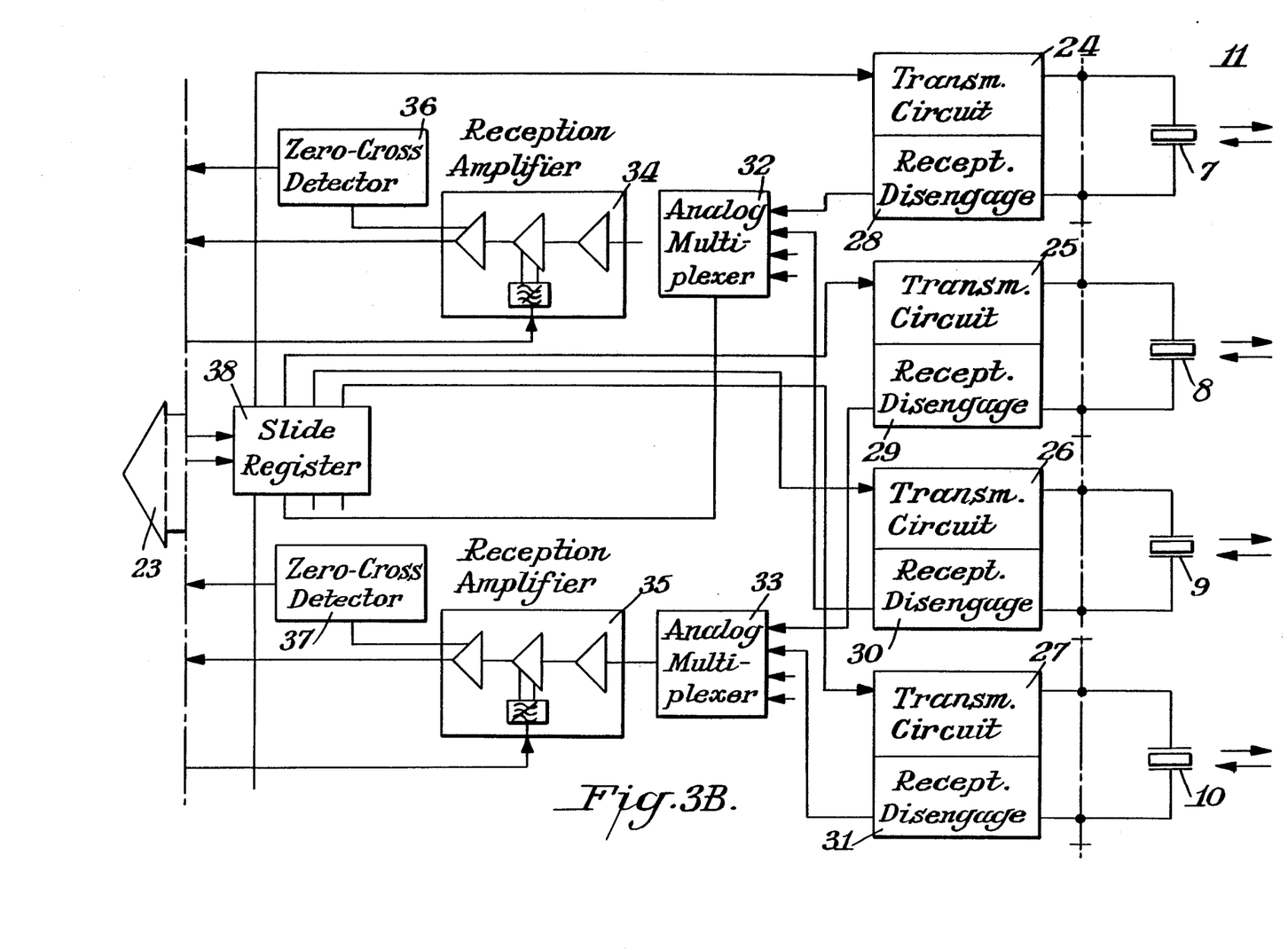

A control circuit 11 for the ultrasonic locating device 4 is shown in FIGS. 3A and 3B. FIG. 3A shows the digital part and FIG. 3B, the analog part of the control circuit 11. In FIG. 3A, a main frame 12 (CPU) is conncted via a data and address bus 13 with a direct access memory 14 (RAM) and a permanent store memory 15 (EPROM) comprising a control program for the control circuit 11 with an output module 16 which submits and accepts data to and from the unmanned vehicle. Via the data and address bus 13, the CPU 12 is connected with other input and output modules 17 and 18 and with a timer/counter module 19 which submit control signals from the data bus 2 to a digital periphery 20 and also transfer signals from the digital periphery 20 to the data bus 2. A watchdog timer 21 is provided which guarantees an automatic restart of the control procedure when interferences in the control circuit 11 occur. The CPU 12 and the timer/counter module 19 are synchronously timed via an oscillator circuit 22. The digital part is connected via digital periphery 20 with the analog part (FIG. 3B) of the control circuit 11 via the coupler lines 23.

According to the exemplified embodiment, a transmission circuit 24, 25, 26 or 27 is provided in the analog part for each ultrasonic transducer 7, 8, 9 or 10. The number of transmission circuits is basically identical to the number of employed ultrasonic transducers. However, the ultrasonic transducers in the exemplified embodiment 7, 8, 9, and 10 are multiplex connected to receive, to two separate reception amplifiers 34 and 35 over receiving couplers 28, 29, 30 and 31 via separate analog multiplexers 32 and 33. The uneven numbered ultrasonic transducers in the exemplified embodiment 7 and 9 are then conducted to the reception amplifier 34 and the even numbered transducers 8 and 10 in the exemplified embodiment are conducted to the reception amplifier 35. The contents of the reception amplifiers 34, 35 are each supplied to a zero-cross detector where they are digitalized. The echo's of the emitted ultrasonic pulses received and digitalized in this way are forwarded from the zero-cross detectors 36, 37 to the digital part of the control circuit 11. If in the digital part of the control circuit 11 in a comparison of the received echo values with there indicated values, an obstacle is determined with its coordinates, control commands are given to the steering and/or brake modules by the control circuit 11 via the input/output module 16 to the unmanned vehicle 1.

A slide register 38, controlled by the digital part of the control circuit 11 selects the active ultrasonic transducers 7, 8, 9, 10 to transmit or receive.

Figure 4:
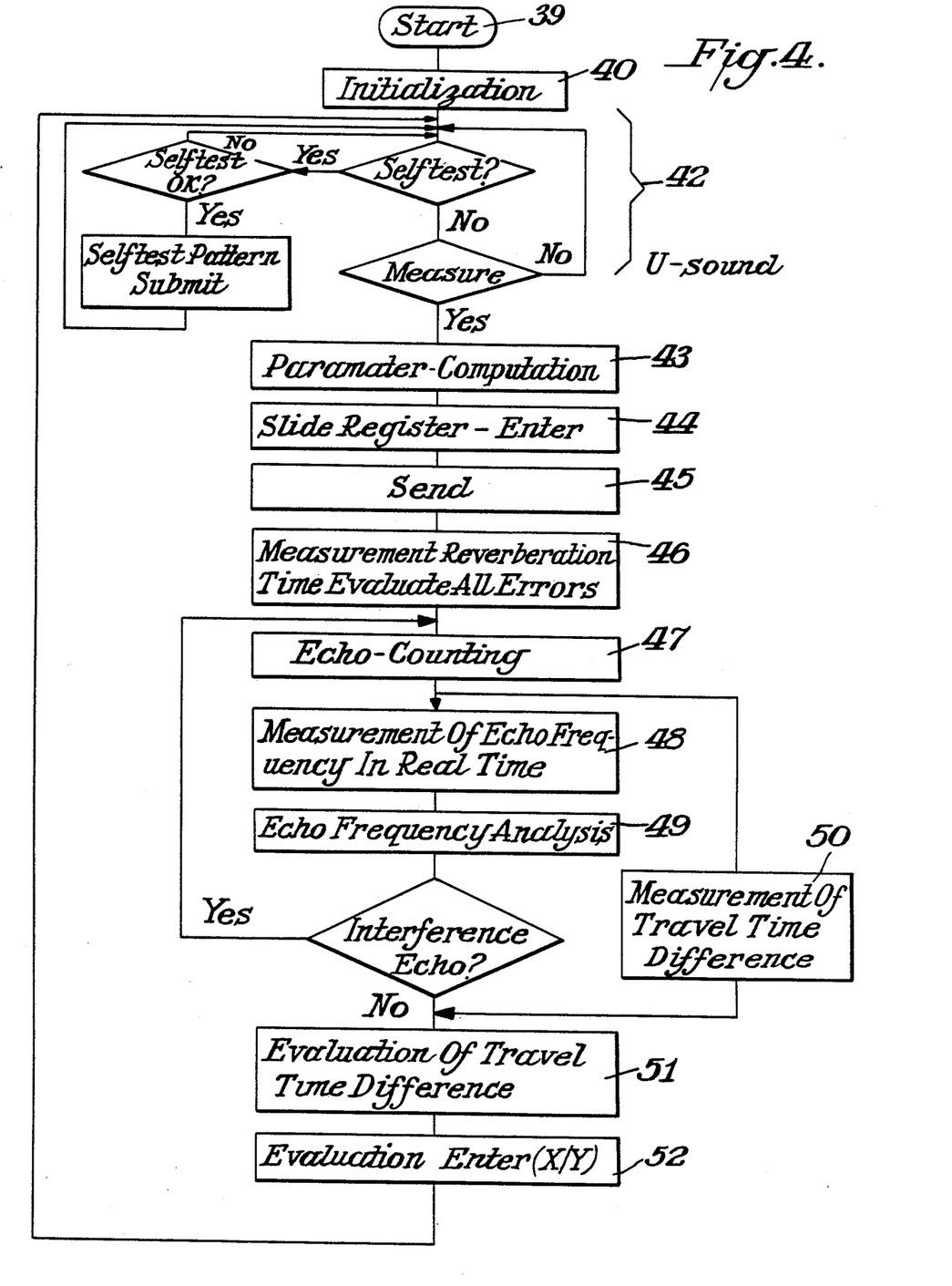
FIG. 4 is a flow diagram illustrating the process of the present invention.

The process is explained in more detail by means of the flow diagram shown in FIG. 4. As a result of a starting signal 39 which prepares the beginning of an ultrasonic measurement, the main frame CPU 12 is restored. In an initializing phase 40, the nature of the operating mode of the bus-compatible modules 16, 17, and 18 is then established. For example, the input/output modules 16, 17, and 18 are divided in inlet and outlet ports. In the timer/counter module 19 comprising several independent timer/counters, the appropriate modes of operation are established, and in the present case these are event counters, programmable mono-flop and square wave generators. The initialization phase 40 also comprises a control-specific data storage in the RAM 14. For example, as a function of the ultrasonic transducer type (electrostatic or piezoelectric) stored in the EPROM 15, the values specific for this type, such as transmission voltage, transmission frequency, transmission pulse sequence and reverberation time are entered in the RAM 14 and from here submitted to the analog part of the control circuit 11 in a measuring procedure via the time/counter module 19.

After the initialization is completed, the switching circuits of the digital periphery 20 such as multiplexer, flip-flop, mono-flop and gate are first put in a defined state in a self-test loop 42 via output commands from the output modules 16, 17 and 18. These states are requested via subsequent read-in commands by the input modules 16, 17, and 18. If these agree with a preset pattern, a significant self-test pattern is submitted to the unmanned vehicle 1 via the output module 16. In this self-test loop 42 it is also cyclically determined whether the vehicle requires an ultrasonic localization. If this is so, the measuring process is started with a parameter computation 43. Parameters which may change specific to application are then appropriately converted and entered into the RAM 14. These parameters, in particular, are the number of ultrasonic transducers, ultrasonic transducer types (electrostatic transducers as well as piezotransducers may be used), range in driving direction (X-coordinates), range perpendicular to the driving direction (Y-coordinates), distances between the ultrasonic transducers 7, 8, 9, and 10, height of the ultrasonic transducers, 7, 8, 9, 10 above floor level, and the like. Process characteristic magnitudes are then computed from these parameters such as transmission voltage, transmission frequencies, blocking distances, and waiting periods between the measuring cycles. The next program step 44 then comprises entry of a transmission and receiving pattern in the slide register 38. This establishes which of the ultrasonic transducers 7, 8, 9, and 10 are activated for the subsequent measuring cycle via a serial-in/parallel-out register. In other words, the data between the digital part of the control circuit 11 and the analog part of the control circuit 11 are serially transmitted via the coupler lines 23 so that lines can be saved on the other outlet modules. The sequence and patters according to which the individual ultrasonic transducers 7, 8, 9, and 10 are connected and disconnected are entered into a program table so that the nature of the stepping can be readily varied. Preferably, this takes place from the left to the right front end of the unmanned vehicle 1, the other way around, or even in an alternating manner. After this transmission preparation, the actual transmission of ultrasonic pulses is started in the send transmission program step 45.

Only one pulse, which as a function of the type of transducer consists of several sinusoidal oscillations, is simultaneously fed in equal frequency and in equal phase parallel to two adjacent ultrasonic transducers 7, 8 or 8, 9 or 9, 10 which are switched as transmitters. These convert the electrical pulses to an ultrasonic pulse which is transmitted in the driving direction. A parallel operation of the ultrasonic transmitters provides for an overlay of the ultrasonic waves in the radiation zone which can then result in a decisive range increase so that an ultrasonic monitoring in the order of magnitude of about 8 meters in front of the unmanned vehicle 1 can be conducted.

Depending on the material and the surface configuration of the obstacle, the phase of the reflected sound wave can be changed. Under certain conditions, preferably for textiles such as the clothing of people, the phase of a wave emitted by the ultrasonic transducer can shift by 180° to the ultrasonic wave reflected by the obstacle. This then means an obliteration of the ultrasonic wave so that in this case an obstacle recognition becomes impossible. This disadvantage can be prevented by permanently changing the transmission frequencies as proposed according to the invention since hardly all frequencies can be obliterated by one and the same reflector.

The different transmission frequencies are exclusively produced via software algorithms in order to be able to readily generate as large a transmission frequency spectrum as possible. A programmable mono-flop is then triggered in the timer/counter module 19 via output commands of the input-output module 16. The outlet of this mono-flop drives the transmission circuits 24, 25, 26, and 27, selected via the slide register 38, via different circuits in the digital periphery 20. The transducers 7, 8, 9, and 10 are fed via these transmission circuits which then emit ultrasonic waves. In order to obtain an as large as possible transmission level spectrum as a function of the nature of the obstacle, the transmission voltage is readily varied within broad limits by reprogramming the mono-flop. In particular, the multiple echo's which preferably occur for obstacles near the vehicle are thereby satisfactorily eliminated.

After the energy supply to the transducer is terminated, the oscillation does not immediately stop. The transducer "post" whereby the oscillation amplitudes decay according to an e-function. Reflected echo's can, therefore, not be evaluated in this reverberation time. The reverberation times then essentially depend upon the following parameters:

(a) transducer type: piezotransducers based on the larger mass reverberate longer than electrostatic transducers;

(b) transmission voltage; and (c) amplification number of the receiving circuit.

When in on-line operation this reverberation time is also measured for each transmission pulse. The transducer quality is permanently determined and as a result, according to the invention, an inherently reliable self monitoring of the ultrasonic transducer as transmitter and receiver is attained. This takes place in program section 46 (reverberation time). The reverberation time is then measured by means of an event counter in the time/counter module 19. If the reverberation time falls from a predetermined measuring range, the unmanned vehicle is provided with an error message. This comprises information on the related transducers and gives instructions on the possible cause of the problem.

After the reverberation amplitudes have decayed, all the electronics are switched over for a possible reception of reflected ultrasonic waves. If such a wave arrives at transducers 7, 8, 9, and 10 switched as receivers, the wave is reconverted into an analog electrical signal. This signal is then fed to the appropriate analog multiplexer 32, 33 via the reception coupler and from there to the corresponding reception amplifier 34, 35. This amplifier is provided with a soft-ware related switch able high quality active bandpass filter so that not only a good signal-noise ratio (S/N) and, therefore, a high sensitivity is obtained but in relation to the narrow band, only the emitted frequency is each time filtered out so that a first step to interference echo suppression is taken. After the signal has been amplified, it is fed to a comparator which is set at threshold deviation. The outlet of the comparator is then connected to the input-output module 17, 18 and time/counter module 19 via various switching circuits in the digital periphery 20. The time is then measured from the beginning of the transmitted pulse to the arrival of the echo. This takes place in program step 47 (echo counting). This time has to be multiplied with the speed of sound of the air and divided by the factor "2". The distance (X-coordinate) between the vehicle and the obstacle results. The factor "2" considers the back and forth movement.

It is known in industry that ultrasonic waves can be generated by many different procedures. Since the levels of these waves generally can be similar to the emitted waves, precautions must be taken that inherent echo and interference echo can be differentiated with certainty. According to the invention, this is accomplished with one single measurement which is evaluated in the programs steps 48 and 49. This procedure results in a measured rate of $\approx$ 20 Hz/transducer. This leads to a reaction time of 150 msec. for a vehicle equipped over its vehicle width of one meter with ultrasonic transducers, which is important for a quick reaction of the vehicle in braking or evasive maneuvers.

The differentiation inherent echo or interference echo according to the program steps 48 and 49 derived from the measurement of the echo frequency in real time and the echo frequency analysis is described below by means of FIG. 3. A zero-cross detector 36, 37 is each time connected to the outlets of the reception amplified 34 and 35, and is employed to digitalize the arriving echo oscillations. The digitalized oscillations are then fed to an event counter in the timer/counter module 19 via switching circuits in the digital periphery 20. With this event counter, each second echo oscillation is exactly measured in real time with high timing rates and forwarded via read-in commands to the CPU 12 stored in the RAM 14.

In the echo frequency analysis (program step 49) which begins immediately with the end of the echo pulse, examination occurs as to whether the digitalized echo oscillations lie within a predetermined frequency band. If this is so and the number of measured oscillations exceeds a predetermined minimum number, this echo is evaluated as inherent echo. However, if a certain number of echo oscillations is outside of the frequency frame or is less than the cited minimum number, the measured echo is interpreted as interference echo and ignored for evaluation purposes. In this case, a return to section 47 (echo counting) takes place in which then in the real time frame possibly subsequent inherent echos are anticipated. According to this method it is therefore possible to see through short as well as through amplitude-amplified longer interference echos without expensive hardward-integrator circuits. According to the invention, several frequencies may be interlaced in one transmission pulse for wide band electrostatic transducers which additionally contributes to decision making in the echo analysis. This process, therefore, as a result of program steps 48 and 49, according to the invention, discloses that with exactly one measurement inherent and interference echos can be distinguished with the greatest certainty. This is in distinct contrast to other ultrasonic processes in which time-consuming averaging of a plurality of measurements is employed in an effort to suppress an interference echo and application on unmanned vehicles is only conditionally possible.

According to this process section, the following information is available for the further evaluation:

(a) knowledge on the distance between vehicle and obstacle in driving direction (X-coordinate);

(b) knowledge on the proper echos.

In order to arrive at a conclusion on the more exact position of the obstacle 100, the Y-coordinate distance of the obstacle transversely to the driving direction in relation to the center axis of the vehicle must be determined in the further program steps 50 and 51. According to the invention this takes place with the measurement of the travel time difference 50 $\Delta$ T.

In order to determine the direction of an arriving sound, the device also evaluates the time difference 51 of sound arrival at adjacent transducers.

Figure 5:
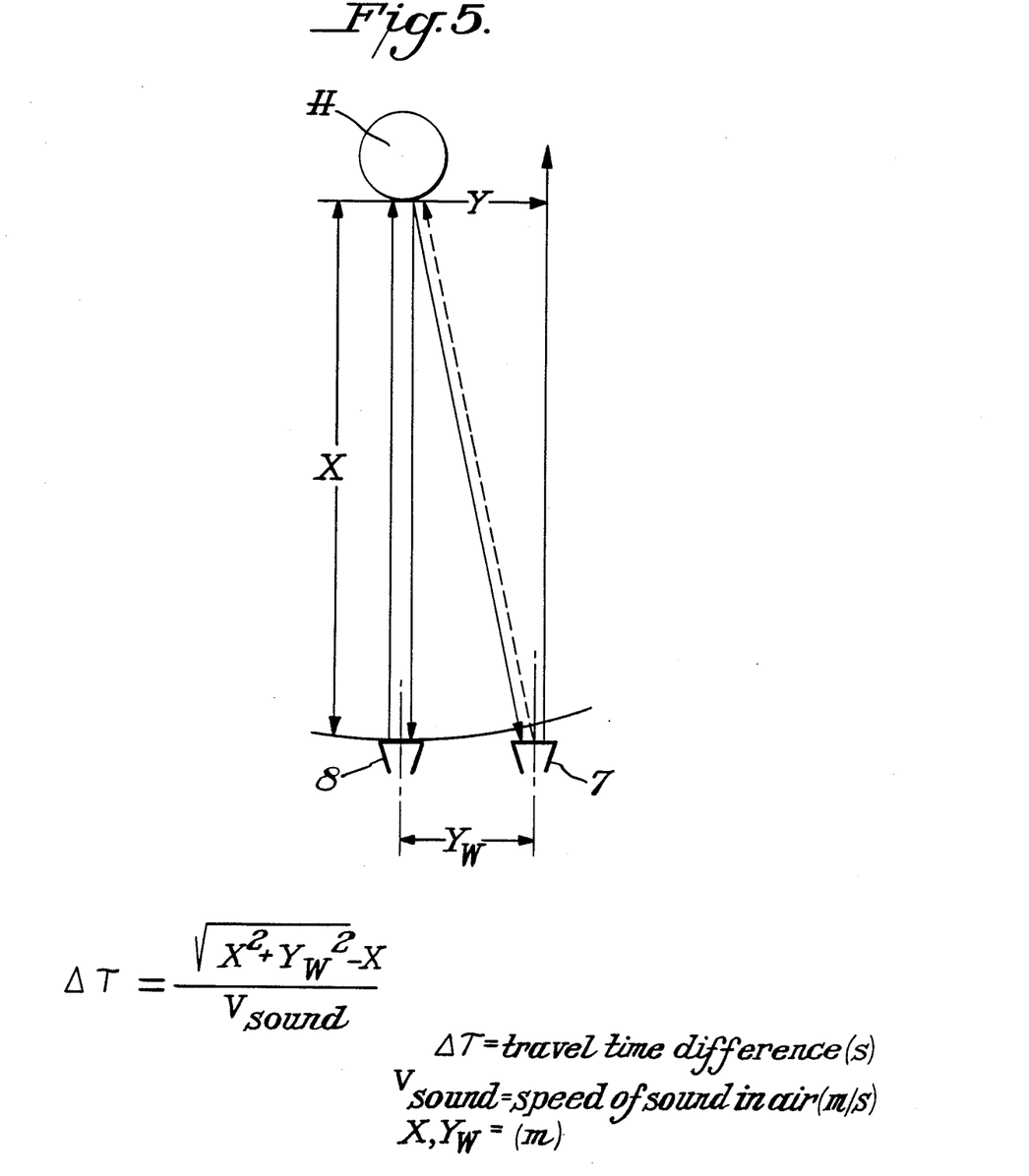
FIG. 5 is a diagram illustrating the principle for detection and computation of the travel time differences.

Two transducers adjacent one another in a row, for example, 7 and 8, are not only simultaneously impacted by a transmission pulse but also simultaneously operated as receivers. The two transducers are impacted by the transmission pulse at the same time, in the same frequency and in the same phase. Both transducers 7 and 8 as receivers are connected to two separate reception amplifier circuits 34 and 35. The time difference of the echo arrival is detected analog via this separate amplifier and then digitalized fed to an event counter of the time/counter module 19. This takes place in program section 50 and must proceed time-parallel with the program steps 48 and 49. The measured travel time difference is then requested via read-in commands of the CPU 12 and is then temporarily stored in the RAM 14 since the evaluation cannot begin until the echo frequency analysis 49 has been completed. The evaluation of the travel time difference $\Delta T$ is based on the principle illustrated in FIG. 5. It can be readily seen that the obstacle H forms a (rectangular) triangle with the two transducers 7 and 8 whereby the travel time difference of the arriving echos can be obtained from the formula in FIG. 5. The travel time difference can likewise be determined when the obstacle H forms a scalene triangle with the transducers 7 and 8. Moreover, since the X-coordinate was already determined and $\Delta T$ was just measured, and the speed of sound is also known, the Y-coordinate can be calculated which also takes place in the program step 51. In the exemplified embodiment, a definite conclusion can now be drawn via the Y-coordinate. By assuming that there is no travel time difference between the two receivers, the obstacle may either be positioned exactly in the center of the two receivers or instead determined that there is a flat reflector (e.g. wall) present transversely to the vehicle. In order to also recognize an obstacle having surface with a different reflection capacity, for example, clothing, boxes, etc. program step 52 requires an additional process step.

Assuming that the result of the first measurement (e.g. transducer 7 and transducer 8) has been stored in the RAM 14, this result can be closer defined as a result of a measurement which includes the following transducer 9. In other words, in the second measurement, the transducers 8, 9 are activated whereby the measuring procedure again completely corresponds to the procedure already given above. In the program step 52, the results of the first and second measurements are then compared, and in this program step 52, the coordinate data $(X/\pm Y)$ of the obstacle is prepared, if plausible, and stored in the RAM 14 for a later forwarding to the vehicle. By plausible is understood, for example, the same x-distance in the measurement with transducers 7 and 9 and transducers 8 and 9 for a wall which is parallel to the front of the vehicle. This may be only a single coordinate indication $(X/\pm Y)$ for small, point-shaped obstacles or also may be more extensive coordinate information $(XN/\pm YN)$ for correspondingly larger and wider obstacles. In the further measuring procedure, the next transducers are step-by-step included in the measurement. In other words, in the next step, the transducers 9 and 10 are used to determine the location. According to the nature and method illustrated above, the newly obtained measuring results are each time compared with the previous results and when new knowledge is obtained, this is appropriately stored in the RAM 14.

Following a complete passage over the entire width of the vehicle, an image about the position and the volume of possible obstacles is obtained. In order to finally round off this image, it is examined once more as a total image over the entire width with respect to its plausibility. Data is only then submitted to the vehicle. In the next passage which may start with the transducers 7 and 8 or 10 or 9, for example, the old image is compared with the new image. If this results in new values, the appropriate data transfer to the vehicle takes place again. If the new images agree with the old images, a repeated data transfer is not necessary and therefore omitted.

According to the invention, safety zones to be maintained on the left and right sides of the vehicle can also be included in the obstacle location determination.

Since the process, as mentioned earlier, operates at a high measuring rate $\approx$ 20 Hz/transducer, obstacles can be very quickly detected, for example, each vehicle width of one meter results in detection time $\approx$ 150 msec. This again means a very fast data transfer to the vehicle for a timely reaction. If the obstacle extends over the entire width of the vehicle, the corresponding image information provides for initiation of vehicle braking. If the obstacle extends over only part of the vehicle width or is a point- or line-shaped obstacle, the vehicle is steered around this obstacle via control commands.

This process not only achieves high location accuracy but also high location sensitivity. For example, a flashlight battery on the ground at a 2.5 m distance from the vehicle can be located. Also, cables having a diameter of 3 mm, for example, which happen to be freely suspended from a roof in front of the vehicle can be detected at a distance of up to 3 m.

Figure 6:
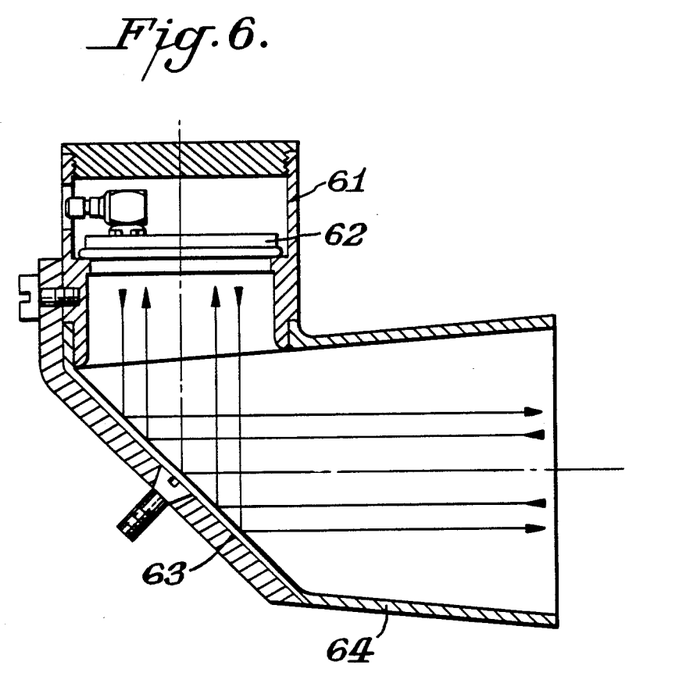
FIG. 6 is a sectional view illustrating an electrostatic transducer as an ultrasonic transmitter and receiver.

According to FIG. 6, an ultrasonic transducer 62 which is an electrostatic transducer, is arranged in a round cylindrical housing 61. Ultrasonic waves coming from the ultrasonic transducer 62 are transmitted via an elliptical deflecting mirror 63 via conical round outlet channel 64. The secondary beams objectionable in the transmission are then eliminated and the main beam is bundled, while the ultrasonic transducer 62 is safely housed against influences from the environment.

Figure 7:
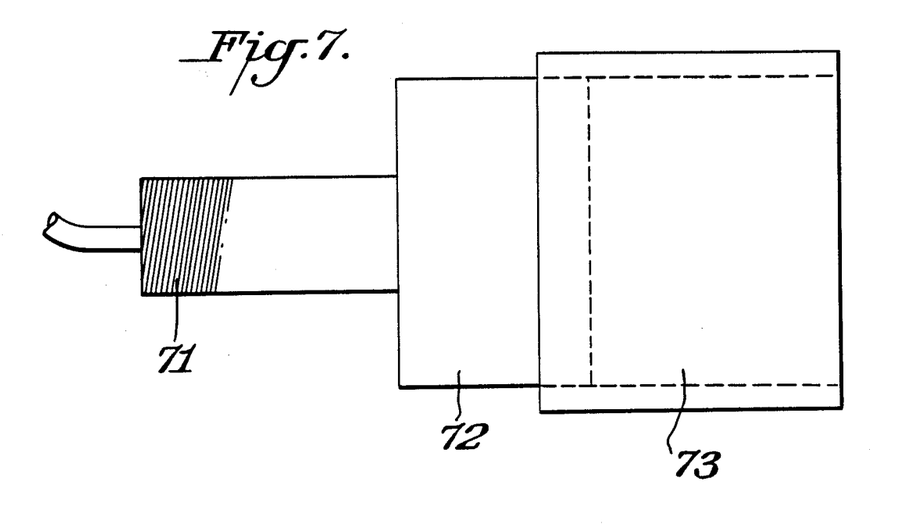
FIG. 7 is a view illustrating a piezotransducer as an ultrasonic transmitter and receiver.

FIG. 7 shows a piezoultrasonic transducer connected via a screw thread 71 with the front of an unmanned vehicle (not shown). A horn 73 is installed in the front of the transducer 72 which also provides for a good bundling and, therefore, good direction in the radiation field.

What is claimed is:

1. A process for locating an obstacle in relation to a coordinate system projected from and movable with an unmanned steerable vehicle having a vehicle width including the steps of emitting ultrasonic pulses of equal phase and equal frequency from the vehicle in the direction of vehicle travel from adjacent first and second sources of ultrasonic pulse transmission on the vehicle, receiving at the first and second sources of ultrasonic pulse transmission pulses reflected back to the vehicle by the presence of an obstacle in the path of vehicle travel, analyzing the pulses reflected back to the vehicle, terminating ultrasonic pulse transmission from the first source of ultrasonic pulse transmission while emitting ultrasonic pulses of equal phase and equal frequency from the vehicle in the direction of vehicle travel from the second source and an adjacent third source of ultrasonic pulse transmission on the vehicle, receiving at the second and third sources of ultrasonic pulse transmission pulses reflected back to the vehicle by the presence of an obstacle in the path of vehicle travel, analyzing those pulses reflected back to the vehicle, continuing a progression of the emitting, receiving, analyzing and terminating of pulses across the width of the vehicle, generating signals in response to all of the reflected pulses and the analyzation thereof, and utilizing such signals to control the vehicle in order to prevent a collision with the obstacle.

2. A process as in claim 1 wherein the ultrasonic pulses of equal phase and frequency initially emitted from the first and second sources are different from the pulses of equal phase and frequency subsequently emitted from the second and third sources after ultrasonic pulse transmission from the first source is terminated.

3. A process as in claim 1 including the step of terminating ultrasonic pulse transmission from the second source of ultrasonic pulse transmission while emitting ultrasonic pulses of equal phase and equal frequency from the vehicle in the direction of vehicle travel from the third source and an adjacent fourth source of ultrasonic pulse transmission on the vehicle, receiving at the third and fourth sources of ultrasonic transmission pulses reflected back to the vehicle by the presence of an obstacle in the path of vehicle travel, and analyzing those pulses reflected back to the vehicle.

4. A process as in claim 3 wherein the ultrasonic pulses of equal phase and frequency initially emitted from the first and second sources are different from the pulses of equal phase and frequency subsequently emitted from the second and third sources after ultrasonic pulse transmission from the first source is terminated, and the ultrasonic pulses of equal phase and frequency subsequently emitted from the second and third sources are different from the pulses of equal phase and frequency subsequently emitted from the third and fourth sources after ultrasonic pulse transmission from the second source is terminated.

5. A process as in claim 3 wherein the emitted pulses takes place from left to right over the width of the vehicle.

6. A process as in claim 1 including the step of determining the travel time of each of the pulses from emission to reflection back to the vehicle, and subtracting the travel times in the progression to determine the position of the obstacle relative to the coordinate system projected from and movable with the vehicle.

7. A system for locating the position of an obstacle relative to a coordinate system projected from and moving with an unmanned vehicle having ultrasonic transmitters and ultrasonic receivers on the front of the vehicle, the system comprising at least three ultrasonic transducers equally spaced apart on the front of the vehicle constructed and arranged as ultrasonic transmitters and ultrasonic receivers, two adjacent first and second transducers transmitting equal frequency and equal phase pulses, means switching the two adjacent first and second transducers from transmitters to receivers after a predetermined time, computer means connected to analyze pulses reflected by an obstacle back to the receivers, means terminating the first transducer, two adjacent second and third transducers transmitting equal frequency and equal phase pulses, means switching the two adjacent second and third transducers from transmitters to receivers after a predetermined time, and wherein the computer means is connected to analyze pulses reflected by an obstacle back to the receivers.

8. A system for locating the position of an obstacle according to claim 7 wherein the transducers as transmitters are each connected with a transmission circuit, and as receivers for an uneven number of transducers, at least two transducers are connected in multiplex wiring with a reception amplifier.

9. A system for locating the position of an obstacle according to claim 8 wherein each transducer is arranged in a circular housing connected with a conical outlet channel which is connected to an elliptical mirror as a deflector inclined at 45° with respect to the transducer, the transducer being arranged in the housing having an inlet surface perpendicular to an outlet surface of the channel, and the ultrasonic waves being deflected at an angle of 90° by the mirror and the sound emitting surface of the transducer being parallel to the inlet surface of the housing.

10. A system for locating an obstacle according to claim 8 wherein each transducer comprises a piezotransducer forming the bottom of a circular housing with a sound opening having an outlet surface, and each piezotransducer having a sound emitting surface parallel to the outlet surface of the sound opening.

* * * * *